Dec. 6, 1949 T. M. JABLON 2,490,058
SLIDE MOUNTING
Filed Feb. 9, 1945 2 Sheets-Sheet 1
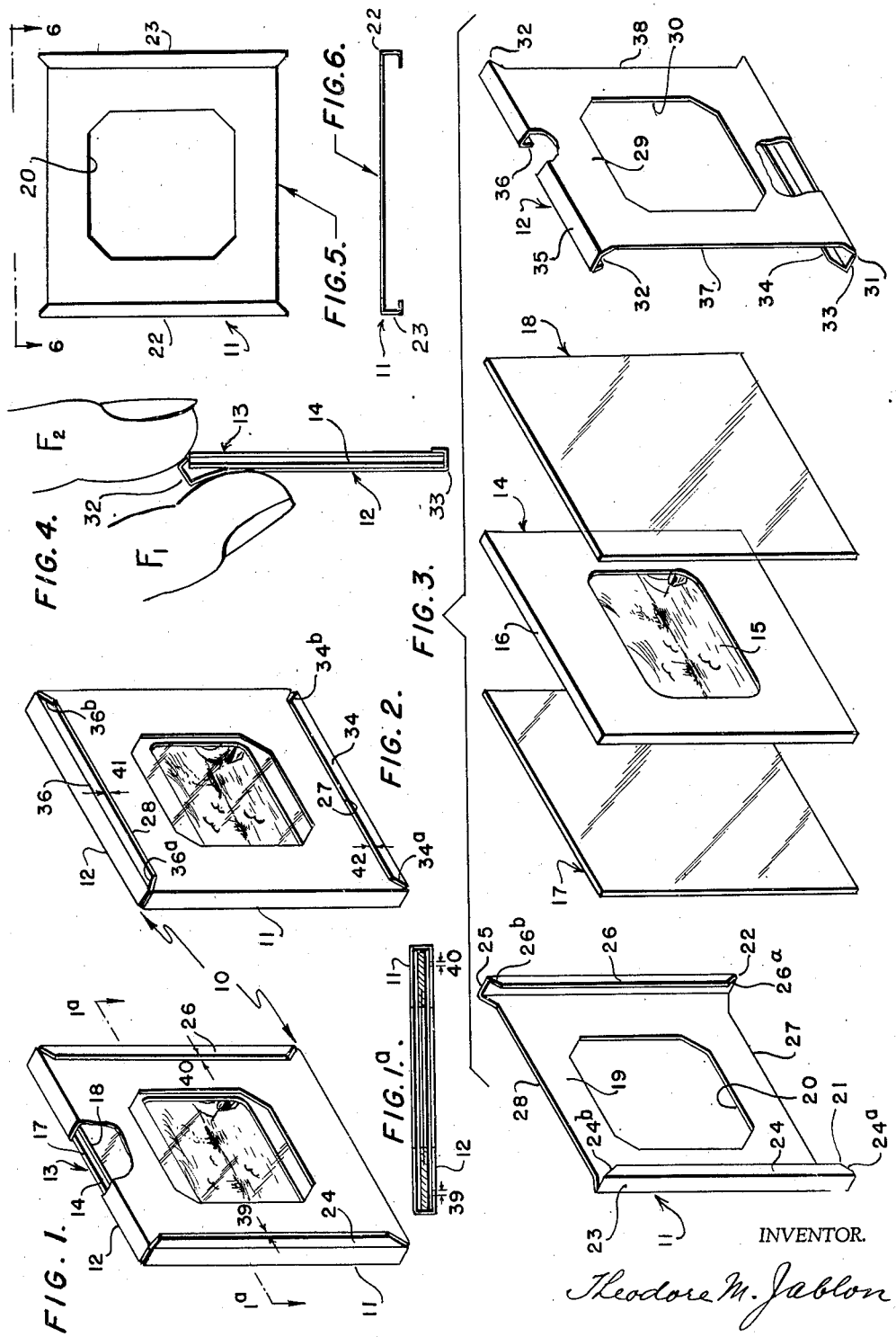
INVENTOR.
Theodore M. Jablon Dec. 6, 1949 T. M. JABLON 2,490,058
SLIDE MOUNTING
Filed Feb. 9, 1945 2 Sheets-Sheet 2
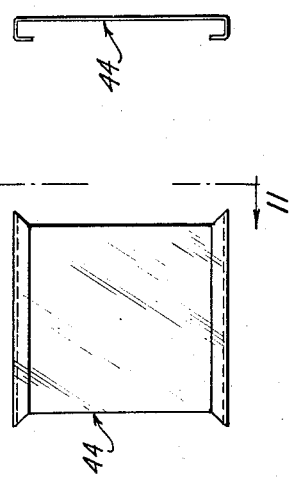
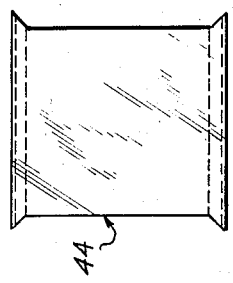
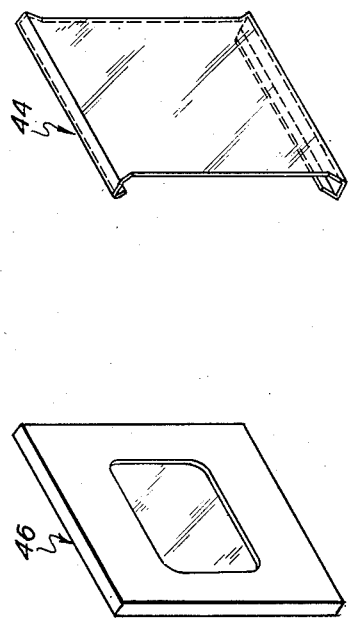
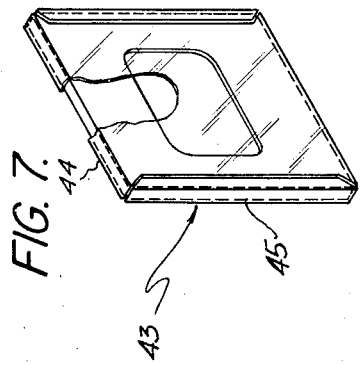
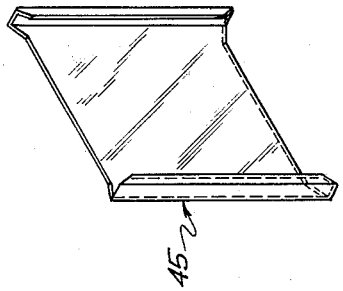
INVENTOR.
Theodore M. Jablon Patented Dec. 6, 1949

2,490,058

UNITED STATES PATENT OFFICE 2,490,058

SLIDE MOUNTING

Theodore M. Jablon, Elmhurst, N. Y.

Application February 9, 1945, Serial No. 576,947

5 Claims. (Cl. 40—152)

This invention relates to transparencies or slides for still projectors or viewers, and more particularly to the mounting of such slides or transparencies.

For example, a color film transparency such as the 35 mm. color film transparency taken with the so-called miniature camera is usually furnished as a mount, that is the film mounted in a card board frame or the like to constitute a slide, leaving the film proper and especially the emulsion side thereof exposed, although adapted for insertion into a projector or viewer. One manner of protecting the film of such mounts is to place the mount between protective transparent or glass plates, whereupon a gummed binder strip or the like is applied edgewise to this assembly of plate elements to complete the mounting of a slide. This slide binding is a time-consuming and tedious operation, and moreover, the gummed binder strip is apt to become damaged or loosened. Another practice is to place a film transparency directly between such protective transparent plates although possibly with the addition of a mask.

It is among the objects of this invention to provide simple means whereby the mounting of a film transparency or slide or "Ready-mount" can be effected rapidly, to provide a mounting which is readily detachable, compact, pleasing in appearance, and smooth to handle.

To this end I provide a pair of clasplike casing members which constitute complementary portions of a casing when combined in crosswise interlocking fashion.

More specifically, these clasps are applicable by being resiliently deflectable.

According to one feature, overhanging edge portions of one clasp interlock with corresponding or complementary adjoining edge portions of the other clasp.

Further particularized, each of the overhanging edge portions of one clasp lodges in a corresponding or complementary recess in the side of the other clasp. In this way the interlocking or interengaging portions of the clasps are flush with one another.

The invention possesses other objects and features of advantage, some of which with the foregoing will be set forth in the following description. In the following description and in the claims, parts will be identified by specific names for convenience. In the accompanying drawings there has been illustrated the best embodiment of the invention known to me, but such embodiment is to be regarded as typical only of many possible embodiments.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Fig. 1 shows one embodiment of the slide mounting, presenting a slide as a whole in perspective viewed from one side.

Fig. 2 shows the slide of Fig. 1 in perspective viewed from the opposite side.

Fig. 1ª is a cross section along the line 1ª—1ª through the slide of Fig. 1.

Fig. 3 shows the slide of Fig. 1 with the component parts thereof drawn apart.

Fig. 4 is a side view of the slide of Fig. 1 partially mounted, and illustrating the manipulation of a clasp.

Figures 5 and 6 are non-perspective plan- and side views respectively of one of the clasps of the Fig. 1 embodiment.

Fig. 7 shows another embodiment of the slide mounting presenting a slide in perspective. and indicates the transparent character of the clasp-like casing portions.

Fig. 8 shows the component portions of the Fig. 1 slide drawn apart.

Fig. 9 is a view upon the outside of a casing portion of the Fig. 7 embodiment.

Fig. 10 is a view upon the inside of the Fig. 9 casing portion.

Fig. 11 is a side view on the line 11—11 of the Fig. 10 casing portion.

The mounted or protected slide 10 shown as a whole in Figures 1 and 2 comprises a pair of clasplike members or clasps 11 and 12 wh'ch enclose an assembly 13 of platelike component elements shown to comprise a "Ready-mount" 14 holding a transparency 15 in a mounting 16 usually in the nature of a frame of card board or the like. and transparent or glass plates 17 and 18 with the mount between them.

The clasps 11 and 12 surround the plate elements of the slide in complementary interlocking fashion, which relationship of the parts is further illustrated in Fig. 3 showing the component elements of the slide drawn apart. The clasps 11 and 12 as here exemplified are identical in structure, but because of their individual functions in the combination a separate detailed description is here given of each of them. Clasp 11 comprises a body portion 19 shown to have a picture opening 20, and a pair of clawlike end portions or claws 21 and 22 opposed to one another. The one claw 21 comprises a transverse or side portion 23 and an overhanging portion or overhang 24 being mitered at the ends 24ª and 24ᵇ. The other claw 22 has a transverse or side portion 25 and an overhanging portion or overhang 26 having mitered end portions 26ª and 26ᵇ. The body portion 19 has a recess 27 at one side and a recess 28 at the opposite side.

The clasp 12 comprises a body portion 29 shown to have a picture opening 30, and a pair of clawlike end portions or claws 31 and 32 opposed to one another. The one claw 31 comprises a transverse or bottom portion 33 and an overhanging portion or overhang 34 being mitered at the ends 34ª and 34ᵇ. The other claw 32 comprises a transverse or bottom portion 35 and an overhanging portion or overhang 36 mitered at the ends 36ª and 36ᵇ. The body portion 29 has a recess 38 at the opposite side.

Figures 5 and 6 are non-perspective views of one of the clasps, for example clasp 11.

While the complementary or interlocking relationship of the clasps 11 and 12 is substantially selfexplanatory from the drawing figures, it appears that the assembly 13 of the platelike component elements of the slide 10 is thus substantially encased by the clasps 11 and 12. In this relationship the overhang 24 of clasp 11 lodges in the recess 37 of clasp 12 providing a clearance 39. The overhang 26 of clasp 11 lodges in the recess 38 of clasp 12 providing clearance 40. Similarly, the overhang 36 of clasp 12 lodges in recess 28 of clasp 11 providing a clearance 41, while overhang 34 of clasp 12 lodges in recess 27 of clasp 11 providing a clearance 42. Clearances 39 and 40 appear more clearly in the cross-sectional view of Fig. 1ª.

The clasps 11 and 12, if made of resiliently deflectable material, for instance thin sheet plastic, can be manipulated as illustrated in Fig. 4 showing the assembly 13 of the plate elements of the slide having attached thereto the clasp 12 which is shown in the process of being inserted or removed by the fingers F₁ and F₂ as the edge portion 32 is being resiliently deflected sufficiently to allow removing or inserting of the slide elements or plates across the overhanging portions 34 and 36.

While the disclosure in the drawings shows a combination within the slide of the mount 14 with the protective transparent or glass plates 17 and 18, this combination may comprise just one transparent element for the mount 14. A film transparency may be positioned between two transparent plates in some way other than by way of a mount 14. In this case a mask may be used between the plates, or the clasps themselves may be made to act as masks. A transparent foil or sheet may be substituted for a transparent plate confined between the transparency and the inner face of one of the clasps. According to still another embodiment the clasps consist of a suitable transparent material for instance plastic, so that the picture opening in the clasp as well as the corresponding transparent protective member or plate can be omitted, allowing the transparent clasp itself to function as the protective element for the transparency. A possible combination thus resulting comprises a pair of transparent clasps encasing a mount 14.

Such an embodiment is therefore shown in the slide or unit 43 in Figures 7 to 11, comprising a pair of clasps or casing members 44 and 45 of transparent material, for example sheet plastic. As indicated in Fig. 7, these casing members being transparent do not require and do not have the picture openings of the Fig. 1 to 6 embodiment, and therefore do not require protective glass plates such as the plates 17 and 18 of the Fig. 1 to 6 embodiment. That is to say, the Fig. 7 to 11 embodiment is shown to comprise the two casing members 44 and 45 in combination with a frame-mounted film or mount 46 similar to the mount 14 of the first embodiment. The casing members 44 and 45 need no further detailed description since otherwise their function and cooperative interrelationship is the same as that of the Fig. 1 to 6 embodiment.

I claim:

1. A slide comprising a transparency, a pair of transparent plates having said transparency interposed between them, and a pair of casing members disposed with their inner sides facing each other to encase said plates, each said member having a body portion provided with a light passage opening for the transparency, and having a pair of overhanging edge portions opposite one another for retaining said plates, and having a pair of open edge portions opposite one another and extending substantially at right angles to said overhanging edge portions, each open edge portion of each said member having a recess complementary to the associated overhanging portion of the other member, the overhanging portions of each member having confined and locked between them the body portion of the other member preventing any substantial displacement of said members with respect to each other.

2. A slide comprising a transparency-holding frame, a transparent plate registering with said frame, and a pair of members disposed with their inner sides facing each other to encase said frame and said plate, each said member having a body portion provided with a light passage opening for the transparency, and having a pair of overhanging edge portions opposite one another for retaining said frame and plate, and having a pair of open edge portions opposite one another and extending substantially at right angles to said overhanging edge portions, each open edge portion of each said member having a recess complementary to the associated overhanging edge portion of the other member, the overhanging portions of each member having confined and locked between them the body portion of the other member preventing any substantial displacement of said members with respect to each other.

3. A slide comprising a transparency-holding frame, and a pair of members of transparent material disposed with their inner sides facing each other to encase said frame, each said member having a body portion and a pair of overhanging edge portions opposite one another and extending substantially at right angles to said overhanging edge portions, each open edge portion of each said member having a recess complementary to the associated overhanging portion of the other member, the overhanging portions of each member having confined and locked between them the body portion of the other member preventing any substantial displacement of said members with respect to each other.

4. In a transparency mounting a casing member having a body portion provided with a light passage opening, and having a pair of overhanging edge portions opposite one another, and having a pair of open edge portions opposite one another and extending substantially at right angles to said overhanging edge portions, said member being associable with a similar casing member so that the inner sides of both members are facing each other, to constitute complementary portions of a casing adapted to encase a picture transparency member, each open edge portion of said member having a recess complementary to an overhanging portion of said similar member, so that the overhanging portions of each member have confined and locked between them the body portion of the other member preventing any substantial displacement of said members with respect to each other.

5. In a transparency mounting a transparent casing member having a body portion, a pair of overhanging edge portions opposite one another, and a pair of open edge portions opposite one another and extending substantially at right angles to said overhanging edge portion, said member being associable with a similar casing member so that the inner sides of both members are facing each other to constitute complementary portions of a casing adapted to encase a picture transparency member, each open edge portion of the member having a recess complementary to an overhanging portion of said similar member, so that the overhanging portions of each member have confined and locked between them the body portion of the other member preventing any substantial displacement of said members with respect to each other.

THEODORE M. JABLON.

REFERENCES CITED

The following references are of record in the file of this patent:

UNITED STATES PATENTS

| Number | Name | Date |
|---|---|---|
| 622,480 | Ives | Apr. 4, 1899 |
| 1,481,120 | Brombosz | Jan. 15, 1924 |
| 1,787,308 | Furlong | Dec. 30, 1930 |
| 1,906,669 | Thomas | May 2, 1933 |
| 2,088,944 | Young et al. | Aug. 3, 1937 |
| 2,165,790 | Engel | July 11, 1939 |
| 2,176,283 | Whiteford | Oct. 17, 1939 |
| 2,217,210 | Bigelow | Oct. 8, 1940 |
| 2,227,986 | Tucker | Jan. 7, 1941 |
| 2,268,529 | Stiles | Dec. 30, 1941 |
| 2,271,530 | Wick | Feb. 3, 1942 |

FOREIGN PATENTS

| Number | Country | Date |
|---|---|---|
| 546,010 | Great Britain | June 23, 1942 |